United States Patent
Meckler

(10) Patent No.: US 6,714,396 B2
(45) Date of Patent: Mar. 30, 2004

(54) UNDERVOLTAGE TRIPPING DEVICE

(75) Inventor: Peter Meckler, Pommelsbrunn/Hohenstadt (DE)

(73) Assignee: Ellenberger & Poensgen GmbH, Altdorf B. Nurnberg (DE)

( * ) Notice: Subject to any disclaimer, the term of this patent is extended or adjusted under 35 U.S.C. 154(b) by 72 days.

(21) Appl. No.: 10/012,159

(22) Filed: Oct. 29, 2001

(65) Prior Publication Data

US 2002/0093778 A1 Jul. 18, 2002

Related U.S. Application Data

(63) Continuation of application No. PCT/EP00/02930, filed on Apr. 1, 2000.

(30) Foreign Application Priority Data

Apr. 28, 1999 (DE) .......................... 199 19 331

(51) Int. Cl.[7] .............................................. H02H 3/24
(52) U.S. Cl. ............................................................ 361/90
(58) Field of Search ................................ 361/42, 77, 90; 335/16, 18

(56) References Cited

U.S. PATENT DOCUMENTS

| | | | | |
|---|---|---|---|---|
| 3,242,383 A | * | 3/1966 | Opad | 317/46 |
| 3,548,259 A | * | 12/1970 | McDonald | 317/18 |
| 3,708,719 A | * | 1/1973 | Ishikawa | 317/13 R |
| 3,868,551 A | * | 2/1975 | Bryan | 317/23 |
| 3,940,664 A | * | 2/1976 | Matsko | 317/31 |
| 3,999,103 A | * | 12/1976 | Misencik et al. | 335/18 D |
| 4,021,703 A | | 5/1977 | Gary et al. | |
| 4,027,204 A | | 5/1977 | Norbeck | |
| 5,260,676 A | * | 11/1993 | Patel et al. | 335/18 |
| 5,777,835 A | | 7/1998 | Innes | |
| 5,834,996 A | * | 11/1998 | Ullermann | 335/6 |

FOREIGN PATENT DOCUMENTS

| | | |
|---|---|---|
| CH | 669 067 A5 | 2/1989 |
| DE | 949 504 | 3/1956 |
| DE | 2 239 654 | 3/1973 |
| DE | 139 189 | 12/1979 |
| FR | 956.492 | 2/1950 |

* cited by examiner

Primary Examiner—Brian Sircus
Assistant Examiner—Zeev Kitov

(57) ABSTRACT

An undervoltage tripping device for a multipolar low-voltage switching device is described. The tripping device contains an electromagnetic tripping mechanism for effectuating a tripping of the multipolar low-voltage switching device given a drop below a predeterminable voltage limit value. The tripping mechanism has a magnetic circuit with a spring-loaded armature and a trip coil including a number of winding portions corresponding to a number of phases of a multiphase power supply circuit. A rectifier bridge is powered by the multiphase power supply circuit. The rectifier bridge has a number of rectifier branches corresponding to the number of the phases of the multiphase power supply circuit. The rectifier bridge is connected to the tripping mechanism and the rectifier branches jointly power the tripping mechanism. The tripping mechanism effectuates an all-pole tripping of the low-voltage switching device given a failure of one of the phases of the multiphase power supply circuit.

5 Claims, 2 Drawing Sheets

UNDERVOLTAGE TRIPPING DEVICE

CROSS-REFERENCE TO RELATED APPLICATION

This application is a continuation of copending International Application No. PCT/EP00/02930, filed Apr. 1, 2000, which designated the United States.

BACKGROUND OF THE INVENTION

Field of the Invention

The invention relates to an undervoltage tripping device as an attaching module for a multipolar low-voltage switching device. The undervoltage tripping device includes an electromagnetic tripping mechanism for effectuating a tripping of the multipolar low-voltage switching device given a drop below a predeterminable voltage limit value. A rectifier bridge is provided and is powered by the multiphase power supply circuit and has a number of rectifier branches corresponding to the number of the phases of the multiphase power supply circuit. The branches power the electromagnetic tripping mechanism. The electromagnetic tripping mechanism effectuates an all-pole tripping of the multipolar low-voltage switching device given a failure of one of the phases. A corresponding monitoring circuit for detecting phase errors in a multipolar switching device is described in U.S. Pat. No. 3,242,383. The term low-voltage switching device specifically refers to a power switch such as an over-current circuit breaker.

Beyond this, Published, European Patent Application EP 0 802 552 A2 describes this kind of electrical switch which includes an electromagnetic undervoltage tripping device which is constructed as a magnetic circuit with a magnetic coil or tripping coil and a moving magnetic armature. The moving magnetic armature is mechanically coupled with a switching member of the electrical switch in such a way that the switching member is tripped and transferred into its off position when a monitored mains voltage of the supply network that is being protected drops below a prescribed limit value as a consequence of the opening of the magnetic circuit. A reclosing of the switching member given an undervoltage tripping device that is coupled to the electric switch is only possible if the magnetic circuit is reclosed, on one hand, and the monitored mains voltage exceeds the voltage limit value, on the other hand.

The undervoltage tripping device is customarily used in a unipolar or bipolar switching device and supplied by the monitored supply network in one or two phases. But the disadvantage of this type of monophase or biphase powering of the undervoltage tripping device is that, in the monitoring of a multiphase supply network with a tripolar or quadrupolar switching device, the undervoltage tripping device, which is already needed for safety reasons, is unreliable, at least when a phase that is not utilized for the voltage supply to the undervoltage tripping device fails.

SUMMARY OF THE INVENTION

It is accordingly an object of the invention to provide an undervoltage tripping device which overcomes the above-mentioned disadvantages of the prior art devices of this general type, in particular for a tripolar or quadrupolar overcurrent circuit breaker, which provides tripolar protection and can be built modularly with optimal ease as an inexpensive attaching part.

With the foregoing and other objects in view there is provided, in accordance with the invention, an undervoltage tripping device as an attachable module for a multipolar low-voltage switching device. The undervoltage tripping device contains an electromagnetic tripping mechanism for effectuating a tripping of the multipolar low-voltage switching device given a drop below a predeterminable voltage limit value. The electromagnetic tripping mechanism has a magnetic circuit with a spring-loaded armature and a trip coil including a number of winding portions corresponding to a number of phases of a multiphase power supply circuit. A rectifier bridge is provided and is powered by the multiphase power supply circuit. The rectifier bridge has a number of rectifier branches corresponding to the number of the phases of the multiphase power supply circuit. The rectifier bridge is connected to the electromagnetic tripping mechanism and the rectifier branches jointly power the electromagnetic tripping mechanism. The electromagnetic tripping mechanism effectuates an all-pole tripping of the multipolar low-voltage switching device given a failure of one of the phases of the multiphase power supply circuit. The rectifier bridge is a three-pulse bridge circuit, each of the winding portions of the electromagnetic tripping mechanism are disposed in one of the rectifier branches. The failure of at least one of the phases has an effect that a restoring force acting on the armature surpasses a holding power generated by the magnetic circuit.

The tripping device therein effectuates an all-pole tripping of the switching device given failure of only one phase.

The invention is thus based on the consideration that, when a three-pulse rectifier bridge circuit is utilized, given failure of only a single phase on the supply side on the alternating current side, the effective value of the current on the direct current side already drops in correspondence to the emerging gap in the direct current. If the direct voltage emerging on the direct current side of the three-pulse bridge circuit is applied as the supply voltage for the electromagnetic tripping mechanism of the undervoltage trip, the effective value of the supply voltage also drops as a result of an unbalancing of the rectifier branches within the bridge circuit conditional to the phase failure. The direct voltage of the multipolar or multiphase rectifier bridge circuit, which voltage is utilized to power the electromagnetic tripping mechanism of the undervoltage trip, thus directly replicates the failure of each individual phase of the monitored supply network and can therefore be used as a reliable trip criterion.

In the principal embodiment of the invention, the direct voltage which is generated by the rectifier bridge serves as a holding voltage for an armature which is situated in a magnetic circuit or magnetic system which is acted upon by a restoring force, which force opposes a holding power that is generated by the holding voltage. When the effective value of the holding voltage drops owing to an unbalancing of the rectifier bridge, the magnitude of the holding power is smaller than the magnitude of the restoring force, with the result that the armature lowers, bringing about the desired tripping. In a particularly expedient development, the functional principle is realized in that the tripping mechanism contains a U-shaped yoke with a coil body, which bears individual coil portions of the trip coils. The coil body is expediently subdivided into a number of adjacent chambers corresponding to the number of winding portions. The winding portions can also be wound over one another in a yoke bearing an unpartitioned, i.e. non-subdivided, coil body and separated from one another by insulating films.

The number of winding portions corresponds to the number of rectifier branches, which contain the individual winding portions in a series circuit with respective rectifier diodes. The electromagnetic tripping mechanism is thus expediently a trip relay that is constructed with a corresponding coil body, which can also be constructed small. The tripping mechanism so constructed can then be integrated with the rectifier bridge circuit in a housing, which can be utilized as an attaching module for the switching device.

The dropping resistor which is required for the electromagnetic tripping mechanism, particularly for its trip coils, can be realized by an individual ohmic resistor connected to the tripping mechanism on line side, or a number of subresistors corresponding to the number of rectifier branches. The dropping resistor, i.e. the corresponding dropping resistance value for the tripping mechanism, is expediently split into the individual phases in the rectifier branches in equal parts.

The specific advantage achieved by the invention is that, by powering an electromagnetic tripping mechanism by way of a tripolar rectifier bridge circuit, a multiphase undervoltage trip is provided, which effectuates an all-pole tripping of the connected switching device given failure of an arbitrary phase of the monitored supply network. The undervoltage trip so constructed is particularly suitable as an attaching module for a tripolar or quadrupolar overcurrent circuit breaker.

The undervoltage tripping device, in conjunction with a corresponding switching device or power switch, thus provides a reliable all-pole protection of a consumer that is connected to the corresponding supply network, regardless of which and how many phases of the supply network fail.

In accordance with an added feature of the invention, each of the rectifier branches has at least one diode with a cathode side and one ohmic resistor connected downstream from the diode on the cathode side. A total resistance value of the resistors in the rectifier branches corresponds to a dropping resistance value of the electromagnetic tripping mechanism.

In accordance with an additional feature of the invention, at least one diode is disposed in each of the rectifier branches, and the electromagnetic tripping mechanism has a dropping resistor connected to the diode connected in each of the rectifier branches.

In accordance with a further feature of the invention, the electromagnetic tripping mechanism has a yoke and a coil body supported by the yoke. The winding portions are disposed in the yoke.

In accordance with a concomitant feature of the invention, the coil body is partitioned into a number of chambers corresponding to a number of the winding portions.

Other features which are considered as characteristic for the invention are set forth in the appended claims.

Although the invention is illustrated and described herein as embodied in an undervoltage tripping device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
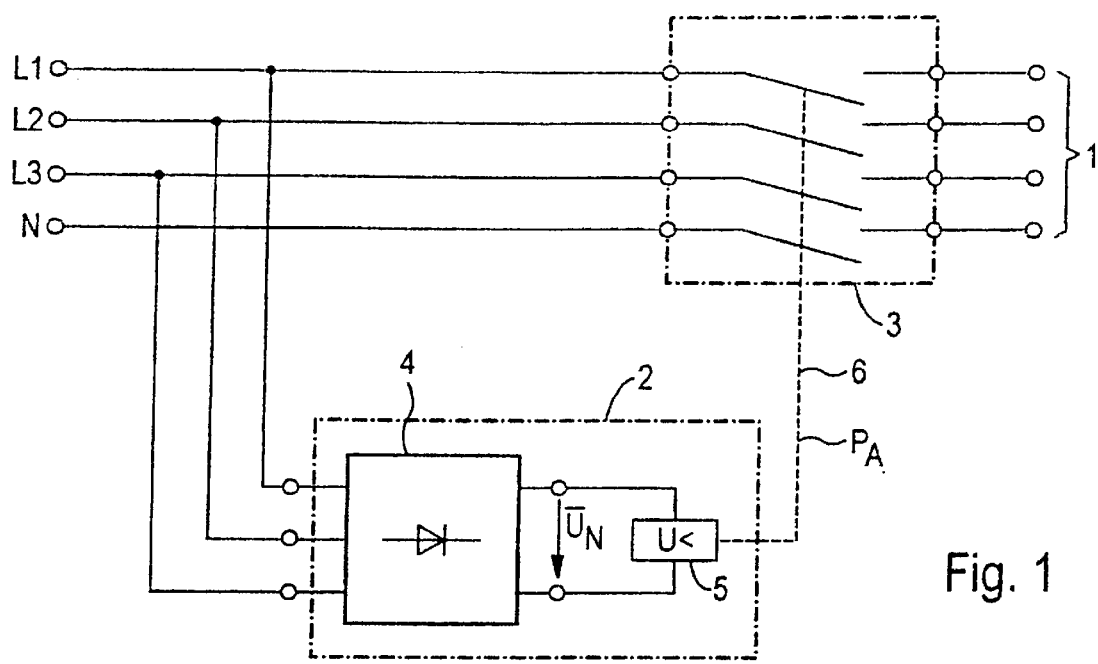
FIG. 1 is a schematic view of an undervoltage tripping device with a D.C. powered tripping mechanism, combined with a line circuit breaker according to the invention.

In all the figures of the drawing, sub-features and integral parts that correspond to one another bear the same reference symbol in each case. Referring now to the figures of the drawing in detail and first, particularly, to FIG. 1 thereof, there is shown a three-phase power supply circuit L1 to L3 with an exemplary additional neutral conductor N. In order to disconnect a connected consumer circuit 1 from the power supply circuit L1 to L3 upon a drop below a desired voltage, an undervoltage tripping device 2 is utilized in combination with a circuit breaker 3 as represented in FIG. 1. The circuit breaker 3 is exemplarily a quadrupolar overcurrent circuit breaker that is connected between the power supply circuit L1 to L3 and the consumer circuit 1. Whenever it is required, the circuit breaker 3 disconnects all conductors of the power supply circuit L1 to L3 from the corresponding conductors of the consumer circuit 1.

The undervoltage tripping device 2 includes a multi-pole rectifier 4, which is connected to all three phases L1 to L3 on an alternating current side and rectifies the alternating current of the individual phases L1 to L3. The rectifier 4 generates a d.c. voltage UN on a direct current side, which can be tapped at the rectifier 4 on an output side. The rectified voltage UN serves for supplying an electromagnetic tripping mechanism 5 of the undervoltage tripping device 2. The tripping mechanism 5 is coupled to a latch of the circuit breaker 3 by way of a mechanical power transmission system 6, for example.

The tripping mechanism 5 effectuates an opening of the circuit breaker or switching device 3 by way of the mechanical force transmission system 6 when the rectified mains or supply voltage $U_N$ falls below a particular prescribed limit voltage U. The circuit breaker 3 is thus tripped at all poles; i.e., all three phases L1 to L3 as well as the neutral conductor N are opened as a result of the undervoltage tripping. The circuit breaker 3 can be closed again only when the rectified voltage UN exceeds the limit voltage U, i.e. when the criterion $U_N>U$ is satisfied. If $U_N<U$, it is impossible to close the circuit breaker. The limit voltage is 0.8 $U_N$ according to DIN EN 60934, for instance.

Figure 2:
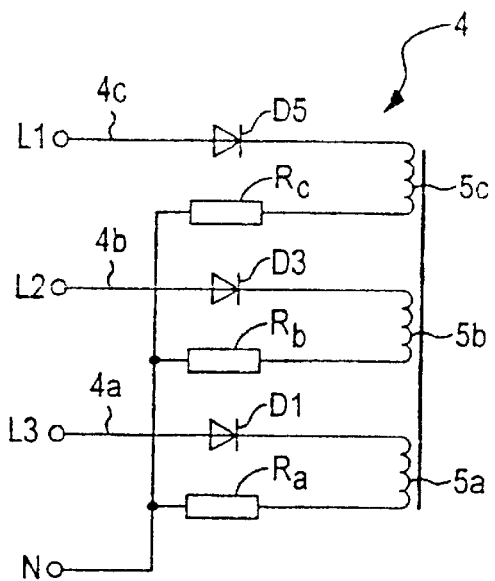
FIG. 2 is a circuit diagram of a three-pulse bridge circuit with windings, which are distributed to rectifier branches, and dropping resistors of, that is to say for, trip coils of the tripping mechanism.
Figure 3:
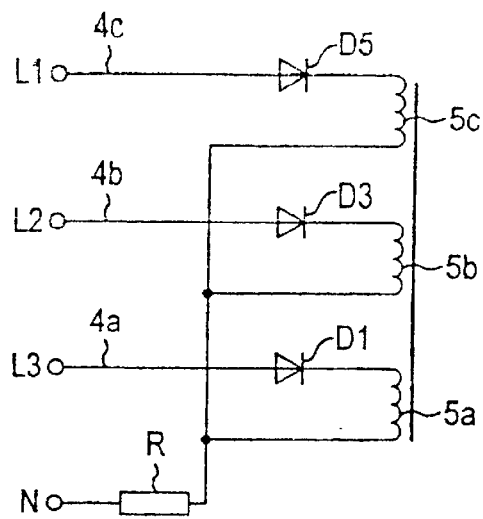
FIG. 3 is a circuit diagram with a single individual dropping resistor.

FIGS. 2 and 3 show preferred embodiments of a three-pulse bridge circuit as the rectifier bridge 4. In the embodiment, a magnetic system is powered by the three-phase rectifier 4 with a subwinding or winding portion 5a to 5c in each connected to a rectifier branch 4a to 4c. In each rectifier branch 4a to 4c, a diode D1, D3 or D5 is connected to the corresponding winding portion 5a, 5b, 5c, respectively, on a line side. In the embodiment represented in FIG. 3, only one dropping resistor R is provided, which is connected to the winding portions 5a to 5c on the load side and shared by these. In contrast, in the embodiment according to FIG. 2, subresistors $R_a$ to $R_c$ in each phase L1 to L3 are connected to the corresponding winding portions 5a, 5b and 5c on the load side. To accomplish this, the subresistors $R_a$ to $R_c$ are at least approximately equally distributed to the three phases L1 to L3, with the winding portions 5a to 5c in the individual rectifier branches 4a to 4c being connected downstream from the respective diodes D1, D3 and D5 on a cathode side. Like the single dropping resistor R, the dropping subresistors R and $R_a$, $R_b$, $R_c$ are also led to the neutral conductor N, while the diodes D1, D3 and D5 are connected to the respective phases L1 to L3 on a anode side. A reverse configuration of the diodes D1, D3, D5 in the rectifier branches 4a to 4c is also possible.

Figure 4:
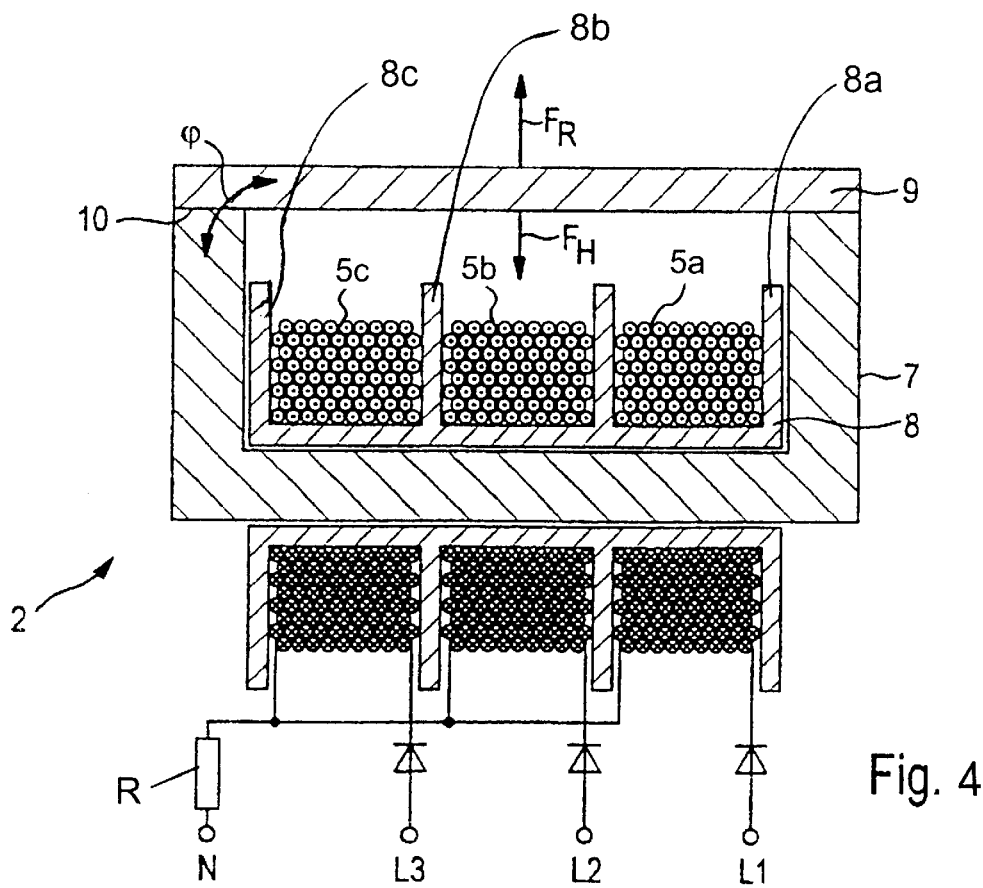
FIG. 4 is a diagrammatic, sectional view of a magnetic circuit with an armature and a yoke that bears a tripartite coil body.

FIG. 4 represents a particularly expedient principal realization of a magnetic system including the undervoltage tripping device 2 having the electromagnetic tripping mechanism 5 and the rectifier bridge 4. Here, a coil body 8 that is partitioned into three chambers 8a to 8c is connected to a U-shaped yoke 7. The three winding portions 5a, 5b and 5c, which lie adjacent one another in the chambers 8a, 8b, 8c and are insulated from one another, are distributed to the three phases L1 to L3 in a wiring configuration as represented in FIG. 3. The dropping resistor R is again led to the neutral conductor N. But in this case also, the dropping resistor R may be partitioned into subresistors $R_a$ to $R_c$ as represented in FIG. 2. A moving armature 9 is allocated to the yoke 7, so that in the configuration the magnetic circuit is closed by way of the yoke 7 and the armature 9.

The yoke 7 and the armature 9 are formed of a ferromagnetic material, whereas the winding portions 5a to 5c of the tripping mechanism 5 are formed of copper or some other electrically conductive material. The coil body 8 is formed of an insulating material. This can also be unpartitioned, whereby the winding portions 5a to 5c are then wound over one another, for instance in the yoke 7 bearing an unpartitioned coil body, and insulated from one another by insulating foils.

In all embodiments represented in FIGS. 2 to 4, the functional concept of the undervoltage tripping device 2 is the same. Namely, given a failure of a phase L1, L2 or L3, the effective value of a current I on the d.c. side of the respective d.c. bridge 4 drops in correspondence to the emerging gap in the d.c. voltage UN. The reason for this is that, when any phase L1, L2 and/or L3 fails, no current flows in the corresponding rectifier branch 4a, 4b, 4c, and the rectifier bridge 4 is consequently unbalanced on the d.c. side, causing the resulting direct current I that flows through the electromagnetic tripping mechanism 5 to drop. Consequently, the rectified mains or supply voltage UN, which determines the holding power of the electromagnetic tripping device 5, also drops. The holding power, on one hand, and a restoring force of the electromagnetic tripping device 5, which opposes it, are now tuned relative to one another in such a way that the restoring force exceeds the reduced holding power. This is represented in FIG. 4 by respective arrows at the armature 9 of the magnetic circuit 5a to 5c, representing the holding power $F_H$ and the restoring force $F_R$.

In this way, a magnetic d.c. field is generated by rectification by the rectifier bridge 4, with the result that a magnetic flux $\phi$ is generated across the coil core, i.e. the yoke 7 and the armature 9. The magnetic flux $\phi$ generates the holding power $F_H$ which pulls the armature 9 to the coil core (i.e. yoke 7) in air gaps 10 in the coil core (i.e. between yoke 7 and armature 9). If a phase L1, L2, L3 fails, the holding power $F_H$ is reduced by an amount corresponding to the imbalance of the rectifier bridge 4, with the result that the armature 9 is lifted from the coil core (i.e. yoke 7) owing to the now relatively large restoring force $F_R$.

The difference between the forces $F_H$ and $F_R$ given three-phase and two-phase current flow is particularly large in the embodiments represented in FIGS. 2 to 4. Therefore, these embodiments are particularly well suited to compensating production tolerances of the electromagnetic tripping mechanism 5.

By virtue of the coupling of the electromagnetic tripping mechanism 5 by way of the power transmission system 6, the exceeding of the holding power $F_H$ by the restoring force $F_R$ brings about a corresponding mechanical impulse $P_A$ on the tripping mechanism of the switching device 3, which is customarily constructed in the form of a latch, as a result of which an all-pole disconnection of the consumer circuit 1 from the power supply circuit L1 to L3, N ensues.

The undervoltage tripping device 2 is expediently constructed as an attaching module in that the rectifier bridge 4 and the electromagnetic tripping mechanism 5 are integrated in a common housing. The modular undervoltage tripping device 2 can thus be utilized for various kinds of low-voltage switching devices. The undervoltage tripping device 2 of this construction is particularly suitable for a three-pole or four-pole overcurrent circuit breaker.

I claim:

1. An undervoltage tripping device as an attachable module for a multipolar low-voltage switching device, the undervoltage tripping device comprising:

an electromagnetic undervoltage tripping mechanism for effectuating a tripping of the multipolar low-voltage switching device given a drop below a predeterminable voltage limit value, said electromagnetic undervoltage tripping mechanism having a magnetic circuit with a spring-loaded armature and a trip coil including a number of winding portions corresponding to a number of phases of a multiphase power supply circuit; and a rectifier bridge powered by the multiphase power supply circuit and having a number of rectifier branches corresponding to the number of the phases of the multiphase power supply circuit, said rectifier bridge connected to said electromagnetic undervoltage tripping mechanism and said rectifier branches jointly power said electromagnetic undervoltage tripping mechanism, said electromagnetic undervoltage tripping mechanism effectuating an all-pole tripping of the multipolar low-voltage switching device given a failure of one of the phases of the multiphase power supply circuit, said rectifier bridge being a three-pulse bridge circuit, each of said winding portions of said electromagnetic undervoltage tripping mechanism disposed in one of said rectifier branches, the failure of at least one of the phases has an effect that a restoring force acting on said armature surpasses a holding power generated by said magnetic circuit.

2. The undervoltage tripping device according to claim 1, wherein each of said rectifier branches has at least one diode with a cathode side and one ohmic resistor connected downstream from said diode on said cathode side, and a total resistance value of said resistor in said rectifier branches corresponds to a dropping resistance value of said electromagnetic undervoltage tripping mechanism.

3. The undervoltage tripping device according to claim 1, including at least one diode disposed in each of said rectifier branches, and said electromagnetic undervoltage tripping mechanism having a dropping resistor connected to said diode connected in each of said rectifier branches.

4. The undervoltage tripping device according to claim 1, wherein said electromagnetic undervoltage tripping mechanism having a yoke and a coil body supported by said yoke, said winding portions are disposed in said yoke.

5. The undervoltage tripping device according to claim 4, wherein said coil body is partitioned into a number of chambers corresponding to a number of said winding portions.

* * * * *